US011551060B2

(12) United States Patent
Liu et al.

(10) Patent No.: US 11,551,060 B2
(45) Date of Patent: Jan. 10, 2023

(54) IDENTIFYING IMAGE AESTHETICS USING REGION COMPOSITION GRAPHS

(71) Applicant: Netflix, Inc., Los Gatos, CA (US)

(72) Inventors: Dong Liu, San Francisco, CA (US); Nagendra Kamath, San Francisco, CA (US); Rohit Puri, Campbell, CA (US); Subhabrata Bhattacharya, Campbell, CA (US)

(73) Assignee: Netflix, Inc., Las Gatos, CA (US)

( * ) Notice: Subject to any disclaimer, the term of this patent is extended or adjusted under 35 U.S.C. 154(b) by 560 days.

(21) Appl. No.: 16/677,161

(22) Filed: Nov. 7, 2019

(65) Prior Publication Data

US 2020/0151546 A1 May 14, 2020

Related U.S. Application Data

(60) Provisional application No. 62/757,726, filed on Nov. 8, 2018.

(51) Int. Cl.
*G06N 3/00* (2006.01)
*G06N 3/04* (2006.01)
*G06N 3/08* (2006.01)
(Continued)

(52) U.S. Cl.
CPC ......... *G06N 3/0454* (2013.01); *G06K 9/6256* (2013.01); *G06K 9/6272* (2013.01);
(Continued)

(58) Field of Classification Search
CPC ...... G06N 3/0454; G06N 3/08; G06K 9/6256; G06K 9/6272; G06K 9/6271; G06T 7/11;
(Continued)

(56) References Cited

U.S. PATENT DOCUMENTS

2015/0036921 A1   2/2015  Lu et al.
2018/0039879 A1*  2/2018  Shaji .................. G06V 10/40
2019/0050681 A1*  2/2019  Tate .................... G06V 40/161

OTHER PUBLICATIONS

Fang et al, Image Aesthetic Distribution Prediction with Fully Convolutional Network, MMM2018: MultiMedia Modeling pp. 267-278 (Year: 2018).*

(Continued)

*Primary Examiner* — Nancy Bitar
*Assistant Examiner* — Xiao Liu
(74) *Attorney, Agent, or Firm* — Greenberg Traurig, LLP

(57) ABSTRACT

The disclosed computer-implemented method may include generating a three-dimensional (3D) feature map for a digital image using a fully convolutional network (FCN). The 3D feature map may be configured to identify features of the digital image and identify an image region for each identified feature. The method may also include generating a region composition graph that includes the identified features and image regions. The region composition graph may be configured to model mutual dependencies between features of the 3D feature map. The method may further include performing a graph convolution on the region composition graph to determine a feature aesthetic value for each node according to the weightings in the node's weighted connecting segments, and calculating a weighted average for each node's feature aesthetic value to provide a combined level of aesthetic appeal for the digital image. Various other methods, systems, and computer-readable media are also disclosed.

20 Claims, 8 Drawing Sheets

(51) Int. Cl.
 *G06T 7/11* (2017.01)
 *G06K 9/62* (2022.01)
 *G06V 10/44* (2022.01)
 *G06V 30/194* (2022.01)
(52) U.S. Cl.
 CPC ............... *G06N 3/08* (2013.01); *G06T 7/11* (2017.01); *G06V 10/454* (2022.01); *G06V 30/194* (2022.01); *G06T 2207/20084* (2013.01)
(58) Field of Classification Search
 CPC ........... G06T 2207/20084; G06T 2207/20072; G06T 2207/30168; G06T 7/0002; G06V 10/454; G06V 30/194; G06V 10/426; G06V 10/82; G06V 20/30
 See application file for complete search history.

(56) References Cited

OTHER PUBLICATIONS

Shelhamer et al, Fully Convolutional Networks for Semantic Segmentation, arXiv:1605.06211v1 (Year: 2016).*

Su et al, Scenic photo quality assessment with bag of aesthetics-preserving features, MM '11: Proceedings of the 19th ACM international conference on Multimedia, Nov. 2011 pp. 1213-1216 (Year: 2011).*

Wang et al, Videos as space-time region graphs, ECCV (Year: 2018).*

Ma et al, A-Lamp: Adaptive Layout-Aware Multi-Patch Deep Convolutional Neural Network for Photo Aesthetic Assessment, CVPR 2017, pp. 4535-4544 (Year: 2017).*

Yang et al, DenseASPP for Semantic Segmentation in Street Scenes, CVPR pp. 3684-3692 (Year: 2018).*

International Search Report and Written Opinion received for PCT Application Serial No. PCT/US2019/060365 dated Mar. 18, 2020, 12 pages.

Shelhamer et al., "Fully Convolutional Networks for Semantic Segmentation", URL: https://arxiv.org/pdf/1605.06211.pdf, May 20, 2016, pp. 1-12.

Scarselli et al., "The Graph Neural Network Model", IEEE Transactions on Neural Networks, vol. 20, No. 1, Jan. 1, 2009, pp. 61-80.

Liu et al., "Composition-Aware Image Aesthetics Assessment", URL: https://arxiv.org/pdf/1907.10801.pdf, Jul. 25, 2019, 10 pages.

* cited by examiner

IDENTIFYING IMAGE AESTHETICS USING REGION COMPOSITION GRAPHS

CROSS-REFERENCE TO RELATED APPLICATIONS

This application claims priority to and the benefit of U.S. Provisional App. No. 62/757,726, filed on Nov. 8, 2018, which application is incorporated by reference herein in its entirety.

BACKGROUND

Identifying aesthetically pleasing images is a task that is typically easy for a human to perform but has proven very difficult for machines to perform. In some cases, neural networks have been applied to the task, learning from images that are known to be aesthetically pleasing and then applying that knowledge to subsequent images. Some approaches attempt to detect objects in an image using a feature encoder and then encode the features of those regions in a certain type of data structure. This approach, however, is very sensitive to the quality of the feature detectors used, and any inaccuracies in detection may destroy the composition information of the entire region collection.

SUMMARY

As will be described in greater detail below, the present disclosure describes systems and methods for improving automated image aesthetics assessment using fully convolutional networks (FCNs) and region composition graphs.

In one example, a computer-implemented method for improving automated image aesthetics assessment may include generating a three-dimensional (3D) feature map for a digital image using a fully convolutional network. The 3D feature map may be configured to identify various features of the digital image and identify an image region for each identified feature. The image region may indicate that features' spatial layout within the digital image. The method may further generate a region composition graph that includes the identified features and image regions. The region composition graph may be configured to model mutual dependencies between features of the 3D feature map. The region composition graph may include multiple nodes, where each node represents a specified region of the digital image, as well as various weighted connecting segments, where each weighted connecting segment is weighted according to the strength or degree of mutual dependencies between the features of those nodes that are connected by the connecting segment. The method may further include performing a graph convolution on the region composition graph to determine a feature aesthetic value for each node according to the weightings in the node's weighted connecting segments, and calculating a weighted average for each node's feature aesthetic value. As such, a combined weighted average over the nodes of the digital image may represent a combined level of aesthetic appeal for the digital image.

In some examples, generating the 3D feature map for the digital image includes adapting a pretrained image classification convolutional neural network (CNN) into the FCN and transferring various learned representations by controlling a CNN segmentation task. In some examples, the method may further include transforming connected layers generated by the CNN into convolution layers used by the FCN to generate the 3D feature map.

In some examples, the region composition graph may implement graph convolution blocks to model the mutual dependencies identified between visual components in the digital image. The number of graph convolution blocks implemented in the region composition graph may be varied according to desired speed or accuracy.

In some examples, atrous spatial pyramid pooling (ASPP) may be implemented when generating the 3D feature map. Atrous Spatial Pyramid Pooling may concatenate multiple atrous-convolved features using different dilation rates into the 3D feature map. In some examples, ASPP may model multi-scale information in the digital image, allowing the FCN to recognize an object in the digital image at larger or smaller sizes.

In some examples, a specified feature encoder may be implemented to preserve fine-grained visual details in the digital image. In some examples, at each convolution layer, a skip connection may be performed that places those features identified from each earlier convolution layer to the end of the FCN, thereby preserving fine-grained digital image information. In some examples, the method may further include selecting a digital image for presentation based on the calculated weighted average of each node's feature aesthetic value. The selected digital image may be presented as box art representing a multimedia item in a user interface.

In addition, a corresponding system for improving automated image aesthetics assessment may include several modules stored in memory, including a feature map generating module that generates a three-dimensional (3D) feature map for a digital image using a fully convolutional network (FCN). The 3D feature map may be configured to identify features of the digital image and identify an image region for each identified feature, where the image region indicates that features' spatial layout within the digital image. The system may also include a region composition graph generating module that is configured to generate a region composition graph that includes the identified features and image regions. The region composition graph may be configured to model mutual dependencies between features of the 3D feature map. The region composition graph may include multiple nodes, where each node represents a specified region of the digital image, as well as various weighted connecting segments, where each weighted connecting segment is weighted according to the strength of mutual dependencies between the features of those nodes that are connected by the connecting segment. The system may also include a graph convolution module that is configured to perform a graph convolution on the region composition graph to determine a feature aesthetic value for each node according to the weightings in the node's weighted connecting segments. The system may further include an aesthetic appeal determining module configured to calculate a weighted average for each node's feature aesthetic value. As such, a combined weighted average over the nodes of the digital image may represent a combined level of aesthetic appeal for the digital image.

In some examples, the weighted connecting segments in the region composition graph may be presented to visibly indicate the strength of mutual dependencies between node features. In some examples, the image regions of the digital image may be categorized based on which image regions are determined to have the highest feature aesthetic values. In some examples, the FCN may divide the digital image into various grids and may extract numeric feature representations for each grid to categorize the content of that grid. In some examples, dividing the digital image into the grids may result in an n×n grid with n×n numeric representation vectors, and each node in the region composition graph may correspond to one spatial grid.

In some examples, two or more nodes in the region composition graph may be connected by a similarity value calculated based on the numeric representation vectors of the nodes. In some examples, the aesthetic appeal determining module may further indicate, based on the feature aesthetic value for each node, each region's contribution to the combined level of aesthetic appeal for the digital image.

In some examples, the above-described method may be encoded as computer-readable instructions on a computer-readable medium. For example, a computer-readable medium may include one or more computer-executable instructions that, when executed by at least one processor of a computing device, may cause the computing device to generate a three-dimensional (3D) feature map for a digital image using a fully convolutional network, where the 3D feature map is configured to identify features of the digital image and identify an image region for each identified feature, where the image region indicates that features' spatial layout within the digital image. The computing device may then generate a region composition graph that includes the identified features and image regions. The region composition graph may be configured to model mutual dependencies between features of the 3D feature map. The region composition graph may include a plurality of nodes, where each node represents a specified region of the digital image, as well as weighted connecting segments, where each weighted connecting segment is weighted according to the strength of mutual dependencies between the features of those nodes that are connected by the connecting segment. The computing device may also perform a graph convolution on the region composition graph to determine a feature aesthetic value for each node according to the weightings in the node's weighted connecting segments and then calculate a weighted average for each node's feature aesthetic value, such that a combined weighted average over the nodes of the digital image represents a combined level of aesthetic appeal for the digital image.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
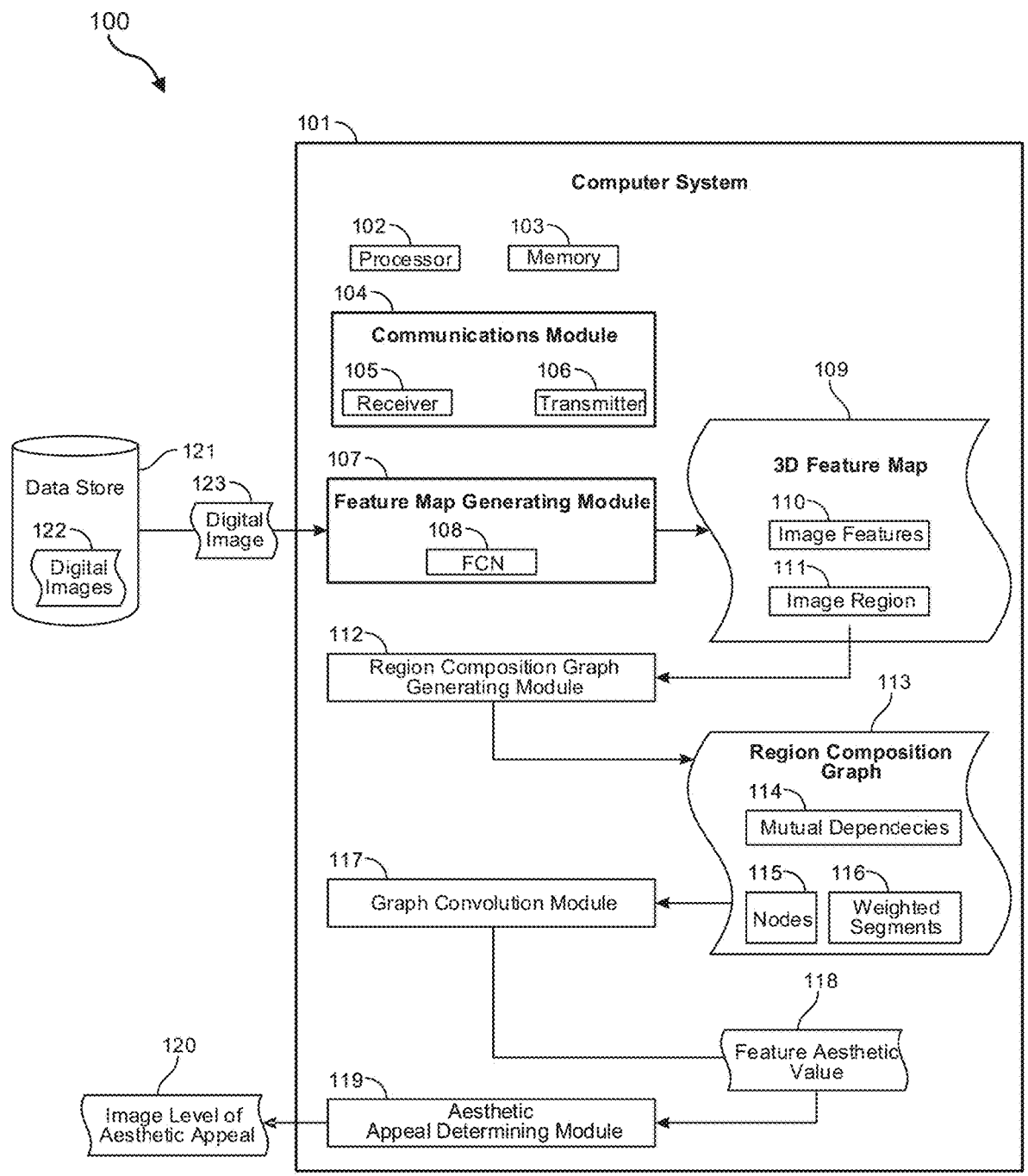
FIG. 1 illustrates a computing environment in which automated image aesthetics assessment may be improved.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to improving automated image aesthetics assessment using an FCN and graph convolution. Traditional systems that attempt to perform automated image aesthetics assessment typically implement neural networks. These neural networks are often designed to train on a set of images that are known to be aesthetically pleasing. The neural networks analyze these preselected images and then apply the knowledge gained from the analysis to future image analyses. These neural networks may be designed to detect objects within an image and/or to detect salient regions in the image using specified types of feature detectors. These objects or regions are typically then encoded in a sophisticated data structure that tracks the encoded objects. In some cases, the data structures may be designed to represent spatial relationships between the identified features in the image.

Operating neural networks in this manner, however, may result in a process that is highly sensitive to the quality of the feature detectors used. Then, any inaccuracies introduced when detecting the image features may be amplified, reducing the likelihood that the identified features actually represent features that are indicative of aesthetic appeal. Still further, traditional neural networks are typically not designed to consider image composition information when performing aesthetics assessments. Omitting such information (including structures and layers of different objects within an image) often leads to results that are inaccurate or are at least suboptimal.

As will be explained in greater detail below, embodiments of the present disclosure may improve automated image aesthetics assessment using an FCN and graph convolution. In some embodiments, the automated image aesthetics assessment may be performed by generating, in one method, a three-dimensional (3D) feature map for a digital image using a fully convolutional network. The 3D feature map may be configured to identify various features of the digital image and identify an image region for each identified feature. The image region may indicate that features' spatial layout within the digital image. The method may further generate a region composition graph that includes the identified features and image regions. The region composition graph may be configured to model mutual dependencies between features of the 3D feature map. The region composition graph may include multiple nodes, where each node represents a specified region of the digital image, as well as various weighted connecting segments, where each weighted connecting segment is weighted according to the strength of mutual dependencies between the features of those nodes that are connected by the connecting segment. The method may further include performing graph convolution on the region composition graph to determine a feature aesthetic value for each node according to the weightings in the node's weighted connecting segments, and calculating a weighted average for each node's feature aesthetic value. As such, a combined weighted average over the nodes of the digital image may represent a combined level of aesthetic appeal for the digital image.

The following will provide, with reference to FIGS. 1-8, detailed descriptions of embodiments and computing environments in which automated image aesthetics assessment may be improved. FIG. 1, for example, may include a computer system 101 that may be used, alone or in combination with other computer systems, to perform automated image aesthetics assessment. FIG. 1 illustrates a computing environment 100 that includes a computer system 101. The computer system 101 may be substantially any type of computer system including a local computer system or a distributed (e.g., cloud) computer system. The computer system 101 may include at least one processor 102 and at least some system memory 103. The computer system 101 may include program modules for performing a variety of different functions. The program modules may be hardware-based, software-based, or may include a combination of hardware and software. Each program module may use computing hardware and/or software to perform specified functions, including those described herein below.

For example, the communications module 104 may be configured to communicate with other computer systems. The communications module 104 may include any wired or wireless communication means that can receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 404 may be configured to interact with databases, mobile computing devices (such as mobile phones or tablets), embedded or other types of computing systems.

The computer system 101 may further include a feature map generating module 107. The feature map generating module 107 may be configured to generate a feature map based on one or more digital images including digital image 123. The digital image 123 may be accessed from a data store 121 that stores multiple different digital images 122. The digital image 123 may be substantially any format, any size, or any type of digital image including a single image or a series of images (e.g., a video). The feature map generating module 107 may be configured to implement a neural network such as a fully convolutional network (FCN) 108 to identify features in the digital image. The FCN 108 may not only identify features of interest in the digital image 123, the FCN may also determine the features' spatial location within the image. This information may be stored in a three-dimensional (3D) feature map 109. The 3D feature map 109 may include the features 110 identified in the digital image 123 and may also include image regions 111 for the identified features indicating the spatial location of each identified feature.

The region composition graph generating module 112 may then access the 3D feature map 109 and generate a region composition graph 113 using the identified image features 110 and the associated image regions 111. The region composition graph generating module 112 may identify mutual dependencies 114 between the features and may create nodes 115 for each feature, along with weighted segments 116 that link the nodes. The weighted connecting segments 116 may be weighted according to the strength of mutual dependencies between the features of those nodes that are connected by that connecting segment. Upon creating the region composition graph 113, the graph convolution module 117 may then perform graph convolution on the region composition graph 113 to generate a feature aesthetic value 118 for each image feature 110. By weighting these feature aesthetic values 118, the aesthetic appeal determining module 119 may determine the overall aesthetic appeal 120 of the image 123. This process will be described in greater detail below with regard to the components and modules of FIG. 1, along with the method 200 of FIG. 2 and the various embodiments depicted in FIGS. 3-8.

Figure 2:
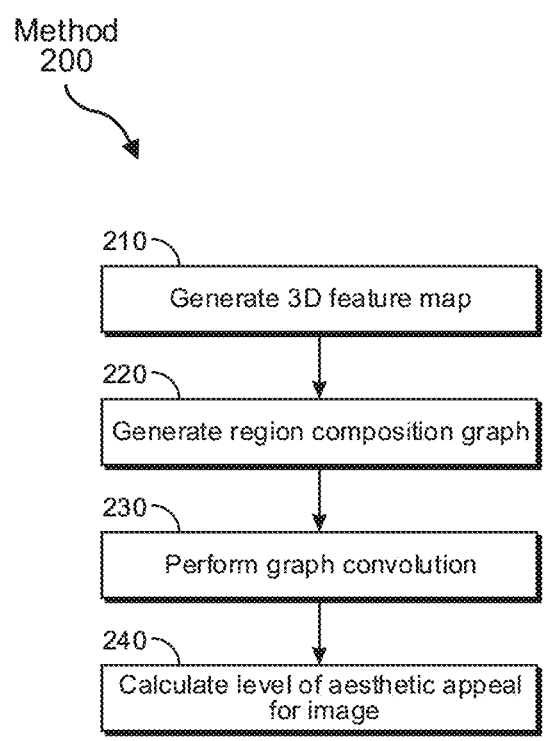
FIG. 2 is a flow diagram of an exemplary method for improving automated image aesthetics assessment.

FIG. 2 is a flow diagram of an exemplary computer-implemented method 200 for improving automated image aesthetics assessment. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

Figure 3:
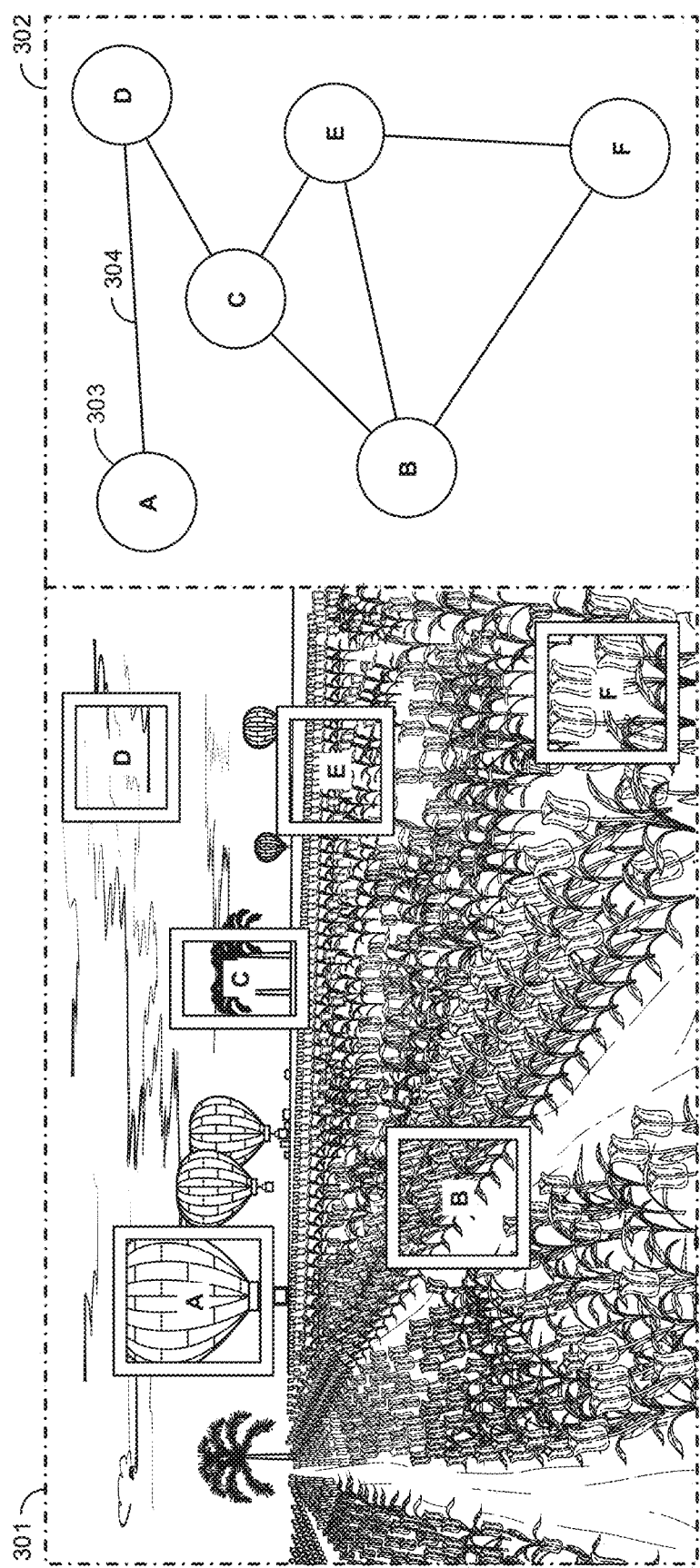
FIG. 3 illustrates an embodiment in which a region composition graph has been generated based on features identified in a digital image.

As illustrated in FIG. 2, at step 210 one or more of the systems described herein may generate a three-dimensional (3D) feature map for a digital image using a fully convolutional network. The 3D feature map may be configured to identify various features of the digital image and identify an image region for each identified feature. The image region may indicate that features' spatial layout within the digital image. For example, as shown in FIG. 3, features A-F may be identified within digital image 301. The FCN 108 of FIG. 1 may identify these features by analyzing different color changes, patterns, spatial layouts, textures, sub-pixel information, and other properties or characteristics of the digital image to identify the features. Among these properties, the composition information of visual elements in the digital image 301 may play a role in assessing image aesthetics. In the visual arts, for example, the visual elements in an image typically do not stand alone, but rather are mutually dependent on each other and collectively manifest the aesthetics property of the whole image. As illustrated in FIG. 3, the local regions corresponding to "blue sky" (D), "hot air balloon" (A) and "gorgeous flowers" (B), (E), and (F), show desirable color harmony and spatial layout, indicating with a high level of confidence that the image should be categorized as a high aesthetics image. The feature map generating module 107 of FIG. 1, including the FCN 108, may thus be configured to look for such features in an image and use those identified features when determining an overall level of aesthetic appeal 120 for an image.

The method 200 may further generate, at step 220, a region composition graph that includes the identified features and image regions. The region composition graph generating module (e.g., 112 of FIG. 1) may be configured to model mutual dependencies 114 between features 110 of the 3D feature map 109. The region composition graph 113

(or 302 of FIG. 3) may include multiple nodes 303, where each node represents a specified region of the digital image (e.g., the region bounded by box A, or box B, or box C, etc. on image 301), as well as various weighted connecting segments 304, where each weighted connecting segment is weighted according to the strength or degree of mutual dependencies between the features of those nodes that are connected by the connecting segment. The weighting may indicate a measure of similarity between node features that are connected by the weighted segment 116. As such, the weighted segments 116 may be weighted based on the strength, the degree, or the extent of the similarities between the features of the nodes 115 that are connected by that weighted connecting segment 116. Because the FCN 108 may be configured to preserve visual elements and the spatial layout of those elements in the image, the region composition graph generating module 112 may use this knowledge of visual elements and spatial layout to determine mutual dependencies and map those dependencies using weighted segments 304.

In some embodiments, a convolution neural network (CNN) may be used alone or in combination with the FCN 108 to perform feature encoding (e.g., identify features in a digital image). The low-level features identified in the shallow layers of a CNN may describe the fine-grained visual details in the image (e.g., the makeup on a person's face) and may be fully leveraged in aesthetics prediction tasks. In some embodiments, a specific feature encoder may be used (e.g., DenseNet) as the backbone of the FCN feature encoder. Feature encoders such as DenseNet may use dense connections to feed the output of each convolution layer to each of the unvisited layers ahead. In this way, the low-level features may be maximally integrated with the semantic features output at the end of the neural network, and may assist in determining mutual dependencies between image features. Once the features and their mutual dependencies have been identified, the embodiments described herein may model those mutual dependencies in a graph-based learning framework such as a region composition graph (e.g., 113 of FIG. 1 or 302 of FIG. 3).

As shown in FIG. 3, mutual dependencies of image regions may be modeled in a graph-based learning framework. The input image may be represented as a region composition graph 302 in which each node (e.g., 303) represents one region in the image corresponding to one specific spatial position in the feature map output from the FCN. The region nodes may then be connected by an edge or weighted segment (e.g., 304) weighted by the similarity of their features. In some embodiments, the weighted connecting segments in the region composition graph 302 may be presented to visibly indicate the strength or degree of mutual dependencies between node features. Thus, for example, nodes that have a larger strength of mutual dependencies may be depicted with thicker lines, or lines with arrows, or dotted lines, or lines that are in some manner distinguished from other lines. On the other hand, nodes that have a smaller strength of mutual dependencies may be depicted with thinner lines, shorter lines, different color lines, or other types of lines that indicate weaker mutual dependencies between those nodes.

Once the region composition graph 302 has been generated, the graph convolution module 117 of FIG. 1 may perform graph convolution on the graph in which the activation of each local region may be determined by its correlated regions. Through this learning process, the system may identify the long-range dependencies of local regions in the image 301 and may seamlessly leverage those dependencies to infer the aesthetics. Indeed, at step 230 in method 200, the graph convolution module 117 may perform a graph convolution on the region composition graph 113 to determine a feature aesthetic value 118 for each node 115 according to the weightings in the node's weighted connecting segments 116. At step 240 of method 200, the aesthetic appeal determining module 119 may then calculate a weighted average for each node's feature aesthetic value 118. This combined weighted average over the nodes of the digital image may then represent a combined level of aesthetic appeal 120 for the digital image 123.

Figure 4:
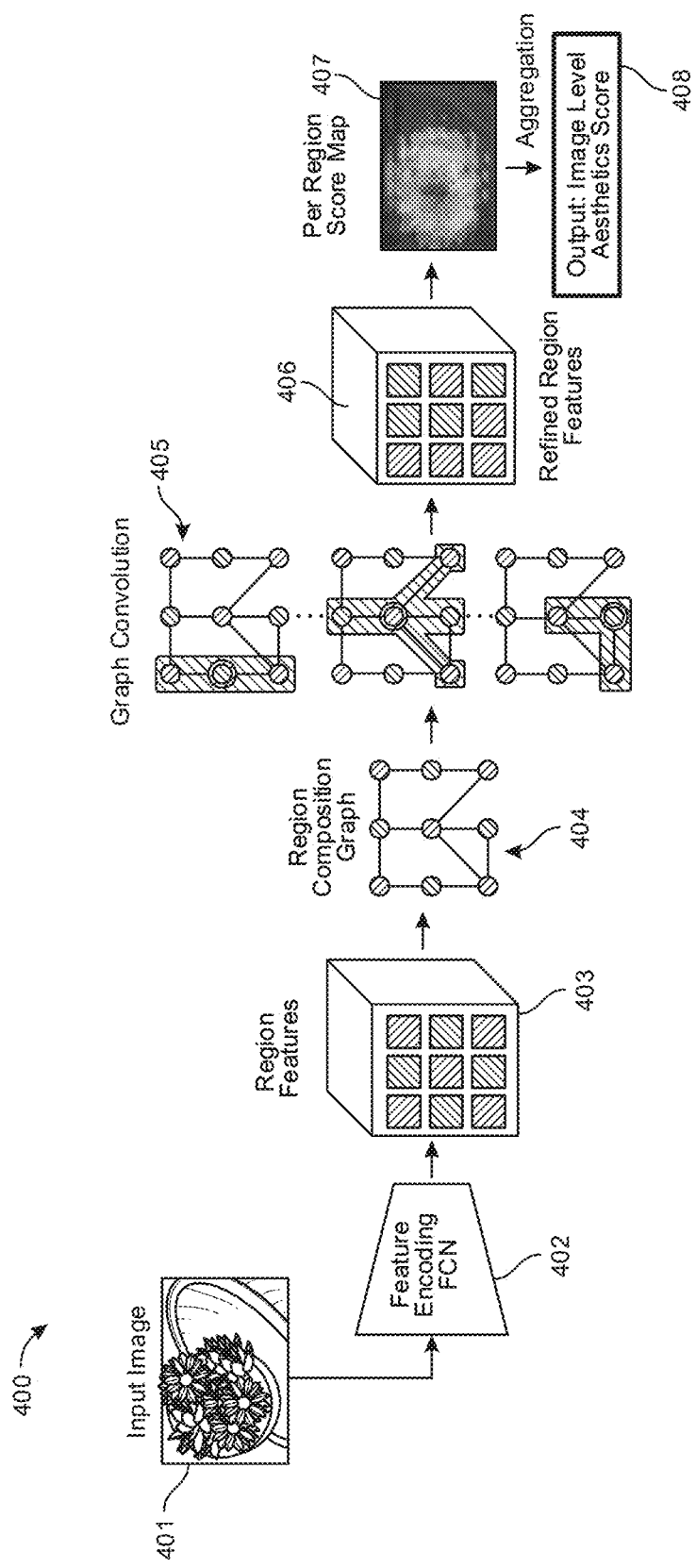
FIG. 4 illustrates an embodiment in which graph convolution is performed on a region composition graph resulting from an input image.

In some embodiments, the systems described herein may adapt a pretrained image classification CNN into an FCN and may then transfer its learned representations by fine-tuning during the 3D feature map generating process. To this end, the fully connected layers in an image classification CNN may be transformed into convolution layers to enable the network to output a 3D feature map to represent the spatially dense regions in the image. FIG. 4, for example, illustrates an end-to-end trainable feed-forward network architecture 400 that includes three modules. The first module is an FCN style feature encoder 402 that generates a 3D feature map 403 to represent the local region features and their spatial layout in the image 401. The second module is a set of graph convolution blocks 405 that perform message passing across regions in the graph 404 to model the mutual dependency of different visual components (as represented in refined region features 406). The third module is a classification head that maps the feature map 407 from previous module into the image level aesthetics score 408.

As noted above, a specified feature encoder may be used when identifying features in a digital image (e.g., DenseNet). The specified feature encoder may act as the backbone of the FCN feature encoder to preserve the fine-grained visual details in the digital image. In some embodiments, specific architectures of the feature encoder designed for image classification may be converted to an FCN (e.g., 108 of FIG. 1). In this conversion, various considerations may be taken into account to enhance the feature map of the FCN to ensure that features are properly represented. The first of these considerations may include increasing the resolution of the feature map. In an unmodified FCN, the output 3D feature map after several pooling layers may have a relatively low resolution (e.g., $\frac{1}{32}$ of the input image resolution), and may incur some amount of information loss. To remedy this, embodiments herein may remove one or more pooling layers and use atrous convolution to make the pre-trained weights for the convolution layers after the removed layers reusable. Thus, the embodiments described herein may remove the classification layer and the various pooling layers in DenseNet, and may then set the dilation rates of the convolution layers after the removed layers to be two and four to make the pre-trained weights reusable. In this way, the dilated DensetNet architecture may output a feature map of $\frac{1}{8}$ input image resolution.

Figure 5:
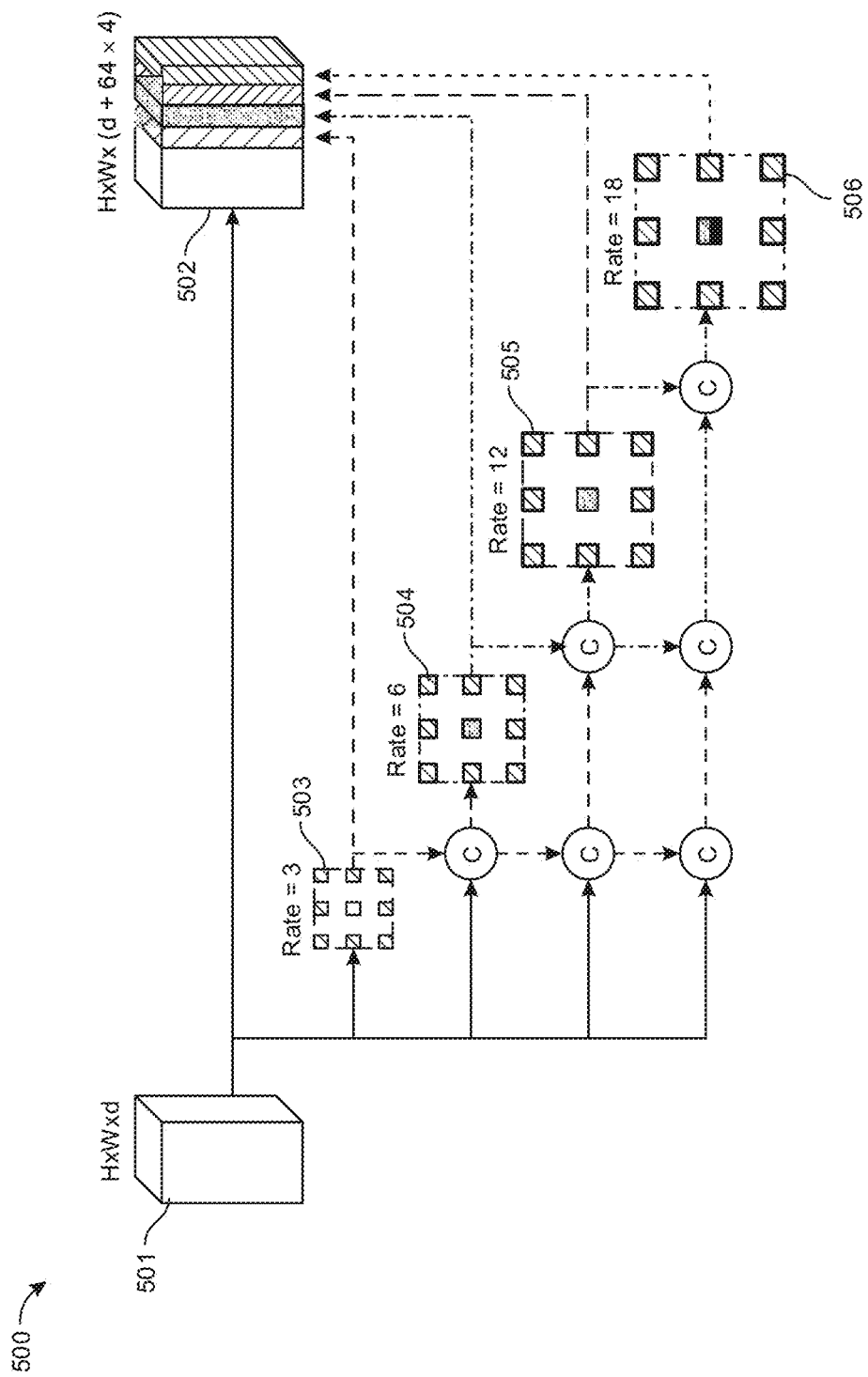
FIG. 5 illustrates an embodiment in which a specified encoder is used to evaluate a digital image.

The second consideration may cause the feature map to encode multi-scale information in order to convey the diverse range of context in the image. To this end, ASPP may be used to concatenate feature maps generated by atrous convolution with different dilation rates so that the nodes in the output feature map include multiple receptive field sizes which encode the multiscale information. In some embodiments, the feature encoder may connect a set of atrous convolution layers in a dense way (e.g., using DenseNet), to generate such context features. As illustrated in embodiment 500 of FIG. 5, given a feature map 501 of dimensions H×W×d output from a dilated feature encoder where H×W represents the spatial dimensions and d represents the channel number, the systems described herein may apply four atrous convolution layers (e.g., 503, 504, 505, and 506) with a dilation rate of 3, 6, 12, or 18, respectively in a cascade fashion, each of which may produce a feature map of dimensions H×W×64. These feature maps may then be concatenated with the input feature map, resulting in a feature map of dimensions H×W× d' where d'=d+4×64.

With the feature map obtained from the feature encoding FCN, the embodiments described herein may construct a region composition graph over the local image regions in the feature space. In the graph, each node may represent a local region, and each pair of nodes may be connected with an edge weighed by their similarity (e.g., as shown in FIG. 3). In some embodiments, the similarity between nodes may be determined by stacking feature vectors from the FCN feature map of dimensions H×W×d' into a matrix and computing the pairwise similarity of matrix values. After computing a pairwise similarity matrix, the embodiments described herein may perform normalization on each row of the matrix so that the sum of all edge weights connected to one node is one. In some cases, a softmax function may be used when performing the normalization. The normalized matrix may be taken as the adjacent matrix representing the relations between the nodes, which characterizes the mutual dependencies of local regions in the digital image.

After the region composition graph is constructed, the embodiments described herein may perform reasoning on the graph by applying graph convolution. Different from the conventional convolution which operates on a local regular grid, graph convolution computes the response of a node based on its neighbors specified by the graph structure (e.g., as shown in FIG. 4). Thus, performing graph convolution over the 3D feature map output by the feature encoding FCN may be equivalent to performing message passing across local regions in the image. The outputs of graph convolution may be the enhanced feature representations for each local region, where the mutual dependencies of various regions are naturally encoded. In some embodiments, three graph convolution layers may be stacked as the region dependency learning module. After each layer of graph convolution, an activation function may be applied on the output 3D feature map. This may reshape the final 3D feature map after the stack of graph convolutions back to a feature map of dimensions H×W×d' for applying the aesthetics classification head.

The updated feature map may then be forwarded to the network head for inferring the aesthetics score of the image. The embodiments herein may aggregate these region-level scores into a single image-level aesthetics score. Various aggregation functions may be used including functions in which local regions with similar scores will have a similar weight in the training procedure with a control value controlling the notion of similarity. In some embodiments, the systems described herein may perform fully convolutional inference to get the aesthetics score on the digital image. At least in some cases, each image is passed through the neural network to get the aesthetics score of each local region in the digital image. Then, various algorithms may be used to aggregate the local region aesthetics scores into the overall image-level aesthetics score. The final classification level may be determined by comparing the scores between and indicating which images had the best and worst image-level aesthetics score.

In some embodiments, as noted above, generating the 3D feature map (e.g., 109 of FIG. 1) for the digital image 123 may include adapting a pretrained image classification convolutional neural network (CNN) into the FCN and transferring various identified features or "learned representations" by controlling a CNN segmentation task. In some cases, the CNN may be configured to divide the digital image 123 into multiple segments as part of a segmentation task. The CNN may use pretrained model parameters when performing this segmentation task. Certain parts of this image segmentation process performed by the CNN may be implemented by the FCN 108 when identifying image features 110 and image regions 111 for the 3D feature map 109. In some cases, any connected layers generated by the CNN may be transformed into convolution layers used by the FCN to generate the 3D feature map. Each convolution layer may provide additional details regarding aspects of the digital image 123 including colors, patterns, textures, transitions, contrasts, image objects, or other types of details.

Figure 6:
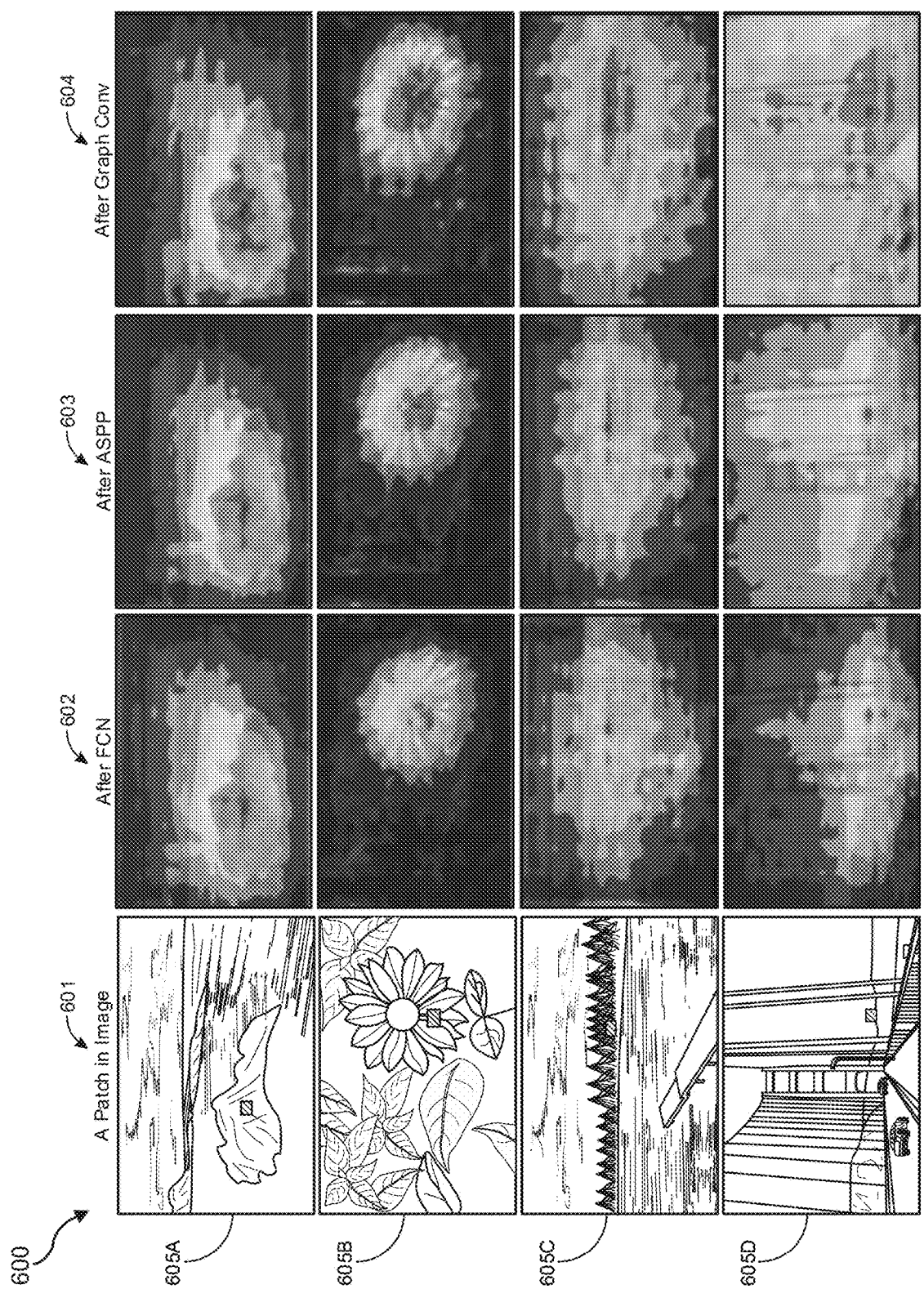
FIG. 6 illustrates a chart of four different images on which varying levels of image aesthetics recognition has been performed.

FIG. 6, for example, illustrates how different regions and different features within those regions are identified as being indicative of aesthetic value. Within chart 600, for example, four images (605A-605D) are shown in their natural state at column 601. At column 602, the FCN 108 may have performed an initial analysis identifying some features as indicative of aesthetic quality (indicated by the lighter colors in the image). After atrous spatial pyramid pooling has been applied in column 603, the identified features are even more defined. Then, after graph convolution has been applied in column 604, the identified features are even more clearly defined. Thus, the FCN, in combination with ASPP and/or graph convolution may be used to analyze the digital image and output a 3D feature map with identified features and the spatial location of those features within the image, determine mutual dependencies between those features, and use the strength of the mutual dependencies to identify those features that are most indicative of aesthetic quality.

In some examples, as noted above, atrous spatial pyramid pooling may be implemented when generating the 3D feature map 109. Atrous spatial pyramid pooling may be configured to concatenate multiple atrous-convolved features using different dilation rates into the 3D feature map 109. In some cases, for example, atrous spatial pyramid pooling may model multi-scale information in the digital image by concatenating one or more atrous-convolved image features using different dilation rates. This may allow the FCN 108 to recognize an object in the digital image at different scales. Thus, if an object such as a person is initially shown at a given size, and later shown at a larger or smaller size (e.g., the camera was zoomed further in or out), the atrous spatial pyramid pooling may allow the FCN to recognized the object as the same object at different scales.

Figure 7:
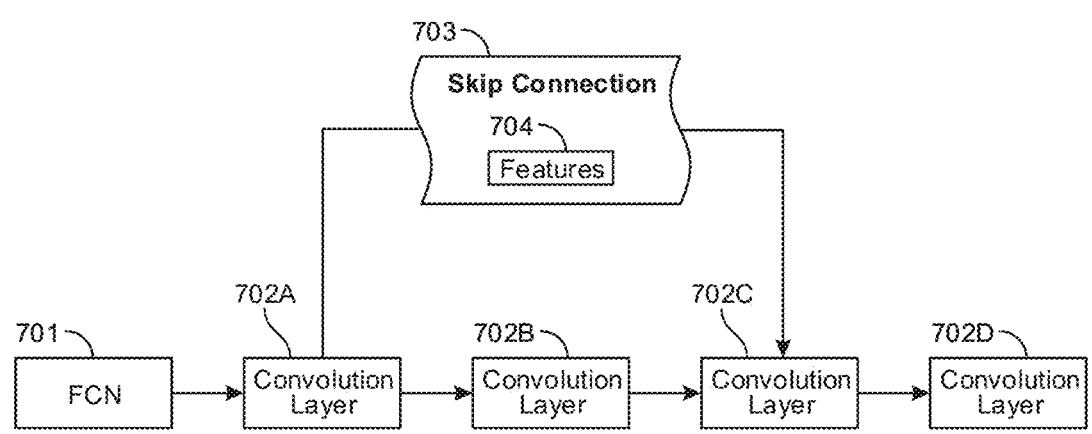
FIG. 7 illustrates an embodiment in which a skip connection is implemented to preserve fine-grained image information.

In addition to recognizing objects at different scales, certain feature encoder may be implemented to preserve fine-grained visual details in the digital image 123. For example, the DenseNet feature encoder may be used when creating the 3D feature map 109. The DenseNet feature encoder may be configured to perform certain steps that preserve fine-grained information related to the digital image 123. For example, feature encoders such as DenseNet may, at each convolution layer, perform a skip connection may be performed that places those features identified from each earlier convolution layer to the end of the FCN, thereby preserving fine-grained digital image information. For example, as shown in FIG. 7, an FCN 701 may output multiple convolution layers 702A-702D. In some cases, these convolution layers may lose some of the fine-grained details related to the digital image being analyzed. As such, the FCN 701 may be configured to perform a skip connection 703 that passes identified image features 704 to other convolution layers so that those features are preserved across the different convolution layers. In this manner, fine-grained details of the digital image may be preserved throughout the feature recognition and 3D feature map generating process.

When identifying different regions and different features in the image, those features and image regions may be categorized based on which image regions are determined to have the highest feature aesthetic values. For instance, the FCN 108 may divide the digital image 123 into various grids and may extract numeric feature representations for each grid. Those numeric feature representations may then be used to categorize the content of that grid. In some embodiments, the FCN 108 may be configured to divide the digital image into grids including an n×n grid with n×n numeric representation vectors. Each node in the region composition graph 113 may correspond to one spatial grid. Within that grid (regardless of size), two or more of the nodes in the various regions of the region composition graph 113 may be connected by a similarity value. This similarity value may be calculated based on the numeric representation vectors that were extracted previously. The similarity value may then be used to determine which features contribute the overall level of aesthetic appeal for the image. In addition to the overall level of aesthetic appeal for the image, the aesthetic appeal determining module 119 may further indicate, based on the feature aesthetic value for each node, each region's contribution to the combined level of aesthetic appeal 120 for the digital image. Thus, users may be aware not only of an overall level of aesthetic appeal for the image, but also which regions on the grid contribute the most to that overall level of aesthetic appeal.

As noted above, in some cases, the region composition graph 113 of FIG. 1 may implement graph convolution blocks (e.g., 503-506 of FIG. 5) to model any mutual dependencies identified between visual components in the digital image 123. The number of graph convolution blocks implemented in the region composition graph 113 may be varied according to desired speed or accuracy. A higher number of graph convolution blocks (e.g., 505 or 506) may yield increased accuracy, albeit at a slower pace, whereas a lower number of graph convolution blocks (e.g., 503 or 504) may yield a decrease in accuracy but may finish more quickly. While specific numbers of graph convolution blocks have been shown in FIG. 5, it will be understood that substantially any number graph convolution blocks may be used when modeling mutual dependencies between visual components in a digital image.

Figure 8:
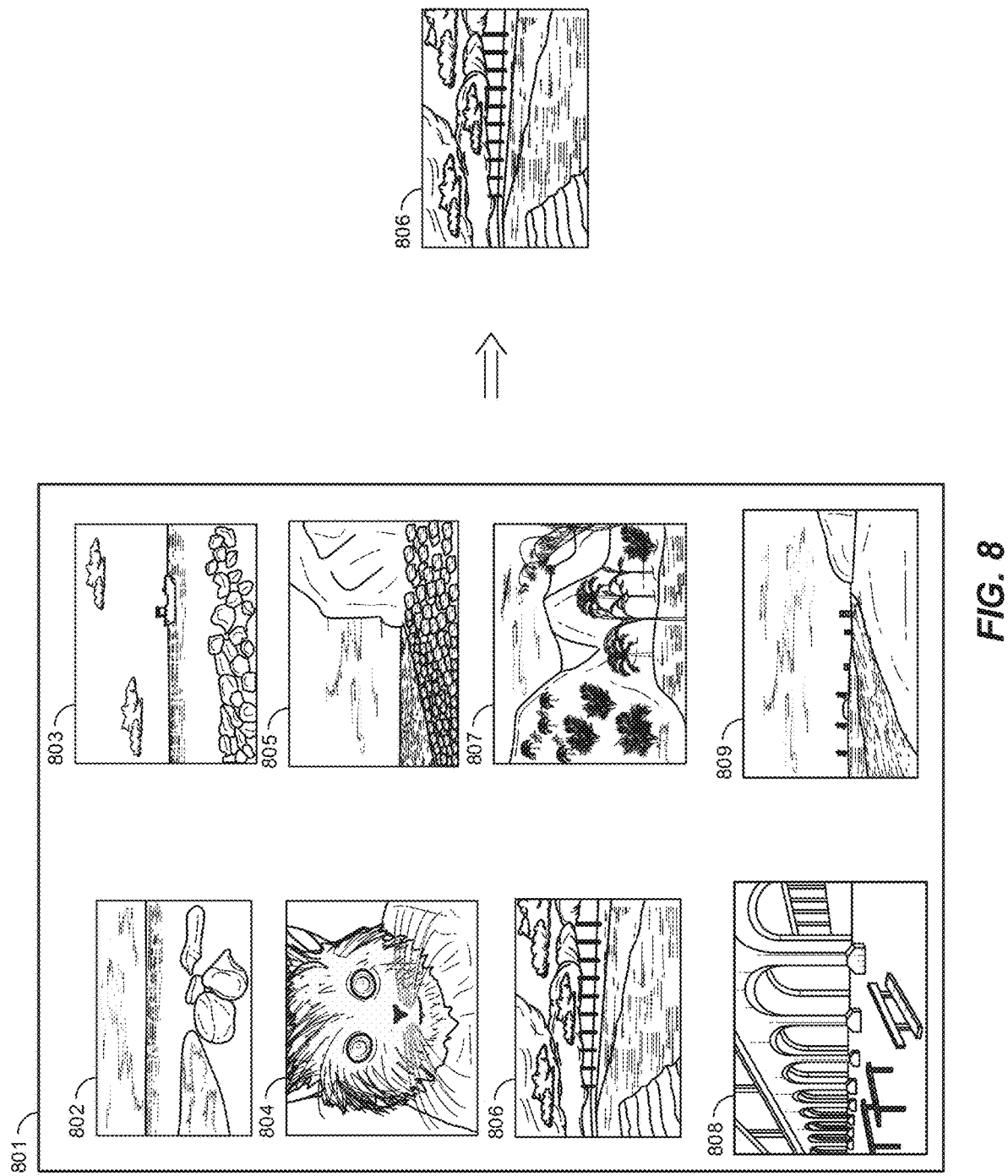
FIG. 8 illustrates an embodiment in which multiple images are evaluated for aesthetics and an image is selected for implementation as box art.

FIG. 8 illustrates an embodiment in which a digital image may be selected for presentation based on the calculated weighted average of each node's feature aesthetic value (e.g., 118 of FIG. 1). In some embodiments, multiple images may be evaluated for their aesthetic appeal. In some cases, a single image may be selected for use in a user interface. For example, a selected digital image may be presented as box art representing a multimedia item in a user interface. For instance, the images 801 may be part of a movie or video. Each of the images 802-809 may be still images taken from the movie, and each may be evaluated for aesthetic appeal. In some embodiments, the image 806 may be determined to have the highest weighted average of each node's feature aesthetic value and, thus, the highest overall level of aesthetic appeal 120. The image 806 may thus be selected for use as box art in a user interface representing the underling movie or video from which the still images 802-809 were selected. It will be understood that the images may be evaluated for and implemented in substantially any type of user interface, including a user interface that allows users to select multimedia items for consumption.

A corresponding system for improving automated image aesthetics assessment may include several modules stored in memory, including a feature map generating module that generates a three-dimensional (3D) feature map for a digital image using a fully convolutional network (FCN). The 3D feature map may be configured to identify features of the digital image and identify an image region for each identified feature, where the image region indicates that features' spatial layout within the digital image. The system may also include a region composition graph generating module that is configured to generate a region composition graph that includes the identified features and image regions. The region composition graph may be configured to model mutual dependencies between features of the 3D feature map. The region composition graph may include multiple nodes, where each node represents a specified region of the digital image, as well as various weighted connecting segments, where each weighted connecting segment is weighted according to the strength of mutual dependencies between the features of those nodes that are connected by the connecting segment. The system may also include a graph convolution module that is configured to perform a graph convolution on the region composition graph to determine a feature aesthetic value for each node according to the weightings in the node's weighted connecting segments. The system may further include an aesthetic appeal determining module configured to calculate a weighted average for each node's feature aesthetic value. As such, a combined weighted average over the nodes of the digital image may represent a combined level of aesthetic appeal for the digital image.

In some examples, the above-described method may be encoded as computer-readable instructions on a computer-readable medium. For example, a computer-readable medium may include one or more computer-executable instructions that, when executed by at least one processor of a computing device, may cause the computing device to generate a three-dimensional (3D) feature map for a digital image using a fully convolutional network, where the 3D feature map is configured to identify features of the digital image and identify an image region for each identified feature, where the image region indicates that features' spatial layout within the digital image. The computing device may then generate a region composition graph that includes the identified features and image regions. The region composition graph may be configured to model mutual dependencies between features of the 3D feature map. The region composition graph may include a plurality of nodes, where each node represents a specified region of the digital image, as well as weighted connecting segments, where each weighted connecting segment is weighted according to the strength of mutual dependencies between the features of those nodes that are connected by the connecting segment. The computing device may also perform a graph convolution on the region composition graph to determine a feature aesthetic value for each node according to the weightings in the node's weighted connecting segments and then calculate a weighted average for each node's feature aesthetic value, such that a combined weighted average over the nodes of the digital image represents a combined level of aesthetic appeal for the digital image.

In this manner, the methods and systems described herein may be used to improve automated image aesthetics assessments. Fully convolutional networks may be used to identify features within an image and identify those features' spatial location within the image. The identified features may then be evaluated to determine mutual dependencies between the features indicating similarities between the features. Then, based on the mutual dependencies and the spatial location of the identified features, the systems described may perform graph convolutions to determine a feature aesthetic value for each spatial region and herein determine an overall level of aesthetic appeal for the image. Other specific types of feature encoders may be implemented to capture image objects at different scales and to preserve fine-grained details related to the image. These techniques may result in an automated aesthetic appeal score that is highly accurate for each image.

EXAMPLE EMBODIMENTS

1. A computer-implemented method comprising: generating a three-dimensional (3D) feature map for a digital image using a fully convolutional network (FCN), the 3D feature map being configured to: identify one or more features of the digital image; and identify an image region for each identified feature, the image region indicating that features' spatial layout within the digital image; generating a region composition graph that includes the identified features and image regions, the region composition graph being configured to model one or more mutual dependencies between features of the 3D feature map, the region composition graph including: a plurality of nodes, wherein each node represents a specified region of the digital image; and one or more weighted connecting segments, wherein each weighted connecting segment is weighted according to the strength of mutual dependencies between the features of those nodes that are connected by the connecting segment; performing a graph convolution on the region composition graph to determine a feature aesthetic value for each node according to the weightings in the node's weighted connecting segments; and calculating a weighted average for each node's feature aesthetic value, such that a combined weighted average over the nodes of the digital image represents a combined level of aesthetic appeal for the digital image.

2. The computer-implemented method of claim 1, wherein generating the 3D feature map for the digital image includes adapting a pretrained image classification convolutional neural network (CNN) into the FCN and transferring one or more learned representations by controlling a CNN segmentation task.

3. The computer-implemented method of claim 2, further comprising transforming one or more connected layers generated by the CNN into convolution layers used by the FCN to generate the 3D feature map.

4. The computer-implemented method of claim 1, wherein the region composition graph implements one or more graph convolution blocks to model the mutual dependencies identified between visual components in the digital image.

5. The computer-implemented method of claim 4, wherein the number of graph convolution blocks implemented in the region composition graph is varied according to desired speed or accuracy.

6. The computer-implemented method of claim 1, wherein atrous spatial pyramid pooling (ASPP) is implemented when generating the 3D feature map.

7. The computer-implemented method of claim 6, wherein ASPP concatenates multiple atrous-convolved features using different dilation rates into the 3D feature map.

8. The computer-implemented method of claim 6, wherein ASPP models multi-scale information in the digital image, allowing the FCN to recognize an object in the digital image at larger or smaller sizes.

9. The computer-implemented method of claim 1, wherein a specified feature encoder is implemented to preserve one or more fine-grained visual details in the digital image.

10. The computer-implemented method of claim 9, wherein at each convolution layer, a skip connection is performed that places those features identified from each earlier convolution layer to the end of the FCN, thereby preserving fine-grained digital image information.

11. The computer-implemented method of claim 1, further comprising selecting a digital image for presentation based on the calculated weighted average of each node's feature aesthetic value.

12. The computer-implemented method of claim 11, wherein the selected digital image is presented as box art representing a multimedia item in a user interface.

13. A system comprising: at least one physical processor; and physical memory comprising computer-executable instructions that, when executed by the physical processor, cause the physical processor to: generate a three-dimensional (3D) feature map for a digital image using a fully convolutional network (FCN), the 3D feature map being configured to: identify one or more features of the digital image; and identify an image region for each identified feature, the image region indicating that features' spatial layout within the digital image; generate a region composition graph that includes the identified features and image regions, the region composition graph being configured to model one or more mutual dependencies between features of the 3D feature map, the region composition graph including: a plurality of nodes, wherein each node represents a specified region of the digital image; and one or more weighted connecting segments, wherein each weighted connecting segment is weighted according to the strength of mutual dependencies between the features of those nodes that are connected by the connecting segment; perform a graph convolution on the region composition graph to determine a feature aesthetic value for each node according to the weightings in the node's weighted connecting segments; and calculate a weighted average for each node's feature aesthetic value, such that a combined weighted average over the nodes of the digital image represents a combined level of aesthetic appeal for the digital image.

14. The system of claim 13, wherein the weighted connecting segments in the region composition graph are presented to visibly indicate the strength of mutual dependencies between node features.

15. The system of claim 13, wherein the image regions of the digital image are categorized based on which image regions are determined to have the highest feature aesthetic values.

16. The system of claim 13, wherein the FCN divides the digital image into one or more grids and extracts numeric feature representations for each grid to categorize the content of that grid.

17. The system of claim 16, wherein dividing the digital image into the one or more grids results in an n×n grid with n×n numeric representation vectors, and wherein each node in the region composition graph corresponds to one spatial grid.

18. The system of claim 17, wherein two or more nodes in the region composition graph are connected by a similarity value calculated based on the numeric representation vectors of the nodes.

19. The system of claim 13, further comprising indicating, based on the feature aesthetic value for each node, each region's contribution to the combined level of aesthetic appeal for the digital image.

20. A non-transitory computer-readable medium comprising one or more computer-executable instructions that, when executed by at least one processor of a computing device, cause the computing device to: generate a three-dimensional (3D) feature map for a digital image using a fully convolutional network (FCN), the 3D feature map being configured to: identify one or more features of the digital image; and identify an image region for each identified feature, the image region indicating that features' spatial layout within the digital image; generate a region composition graph that includes the identified features and image regions, the region composition graph being configured to model one or more mutual dependencies between features of the 3D feature map, the region composition graph including: a plurality of nodes, wherein each node represents a specified region of the digital image; and one or more weighted connecting segments, wherein each weighted connecting segment is weighted according to the strength of mutual dependencies between the features of those nodes that are connected by the connecting segment; perform a graph convolution on the region composition graph to determine a feature aesthetic value for each node according to the weightings in the node's weighted connecting segments; and calculate a weighted average for each node's feature aesthetic value, such that a combined weighted average over the nodes of the digital image represents a combined level of aesthetic appeal for the digital image.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to identify image features, use the result of the transformation to compute an overall aesthetics level for the image, and store the result of the transformation in a data store. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
generating a three-dimensional (3D) feature map for a digital image using a fully convolutional network (FCN), the 3D feature map being configured to:
identify one or more features of the digital image; and
identify an image region for each identified feature, the image region indicating that features' spatial layout within the digital image;
generating a region composition graph that includes the identified features and image regions and implements one or more graph convolution blocks that are variable in number according to a predetermined speed or a predetermined accuracy, the region composition graph being configured to model one or more mutual dependencies between features of the 3D feature map, the region composition graph including:
a plurality of nodes, wherein each node represents a specified region of the digital image; and
one or more weighted connecting segments, wherein each weighted connecting segment is weighted according to a strength of mutual dependencies between the features of those nodes that are connected by the connecting segment;
performing a graph convolution on the region composition graph to determine a feature aesthetic value for each node according to the weightings in the node's weighted connecting segments; and
calculating a weighted average for each node's feature aesthetic value, such that a combined weighted average over the nodes of the digital image represents a combined level of aesthetic appeal for the digital image.

2. The computer-implemented method of claim 1, wherein generating the 3D feature map for the digital image includes adapting a pretrained image classification convolutional neural network (CNN) into the FCN and transferring one or more learned representations by controlling a CNN segmentation task.

3. The computer-implemented method of claim 2, further comprising transforming one or more connected layers generated by the CNN into convolution layers used by the FCN to generate the 3D feature map.

4. The computer-implemented method of claim 1, wherein the one or more graph convolution blocks model the mutual dependencies identified between visual components in the digital image.

5. The computer-implemented method of claim 1, wherein atrous spatial pyramid pooling (ASPP) is implemented when generating the 3D feature map.

6. The computer-implemented method of claim 5, wherein ASPP concatenates multiple atrous-convolved features using different dilation rates into the 3D feature map.

7. The computer-implemented method of claim 5, wherein ASPP models multi-scale information in the digital image, allowing the FCN to recognize an object in the digital image at larger or smaller sizes.

8. The computer-implemented method of claim 1, wherein a specified feature encoder is implemented to preserve one or more fine-grained visual details in the digital image.

9. The computer-implemented method of claim 8, wherein at each convolution layer, a skip connection is performed that places those features identified from each earlier convolution layer to an end of the FCN, thereby preserving fine-grained digital image information.

10. The computer-implemented method of claim 1, further comprising selecting a digital image for presentation based on the calculated weighted average of each node's feature aesthetic value.

11. The computer-implemented method of claim 10, wherein the selected digital image is presented as box art representing a multimedia item in a user interface.

12. A system comprising:
at least one physical processor; and
physical memory comprising computer-executable instructions that, when executed by the physical processor, cause the physical processor to:
generate a three-dimensional (3D) feature map for a digital image using a fully convolutional network (FCN), the 3D feature map being configured to:
identify one or more features of the digital image; and
identify an image region for each identified feature, the image region indicating that features' spatial layout within the digital image;
generate a region composition graph that includes the identified features and image regions and implements one or more graph convolution blocks that are variable in number according to a predetermined speed or a predetermined accuracy, the region composition graph being configured to model one or more mutual dependencies between features of the 3D feature map, the region composition graph including:
a plurality of nodes, wherein each node represents a specified region of the digital image; and
one or more weighted connecting segments, wherein each weighted connecting segment is weighted according to a strength of mutual dependencies between the features of those nodes that are connected by the connecting segment;
perform a graph convolution on the region composition graph to determine a feature aesthetic value for each node according to the weightings in the node's weighted connecting segments; and
calculate a weighted average for each node's feature aesthetic value, such that a combined weighted average over the nodes of the digital image represents a combined level of aesthetic appeal for the digital image.

13. The system of claim 12, wherein the weighted connecting segments in the region composition graph are presented to visibly indicate the strength of mutual dependencies between node features.

14. The system of claim 12, wherein the image regions of the digital image are categorized based on which image regions are determined to have highest feature aesthetic values.

15. The system of claim 12, wherein the FCN divides the digital image into one or more grids and extracts numeric feature representations for each grid to categorize content of that grid.

16. The system of claim 15, wherein dividing the digital image into the one or more grids results in an n×n grid with n×n numeric representation vectors, and wherein each node in the region composition graph corresponds to one spatial grid.

17. The system of claim 16, wherein two or more nodes in the region composition graph are connected by a similarity value calculated based on the numeric representation vectors of the nodes.

18. The system of claim 12, further comprising indicating, based on the feature aesthetic value for each node, each region's contribution to the combined level of aesthetic appeal for the digital image.

19. The system of claim 12, further comprising selecting a digital image for presentation based on the calculated weighted average of each node's feature aesthetic value, wherein the selected digital image is presented as box art representing a multimedia item in a user interface.

20. A non-transitory computer-readable medium comprising one or more computer-executable instructions that, when executed by at least one processor of a computing device, cause the computing device to:
- generate a three-dimensional (3D) feature map for a digital image using a fully convolutional network (FCN), the 3D feature map being configured to:
  - identify one or more features of the digital image; and
  - identify an image region for each identified feature, the image region indicating that features' spatial layout within the digital image;
- generate a region composition graph that includes the identified features and image regions and implements one or more graph convolution blocks that are variable in number according to a predetermined speed or a predetermined accuracy, the region composition graph being configured to model one or more mutual dependencies between features of the 3D feature map, the region composition graph including:
  - a plurality of nodes, wherein each node represents a specified region of the digital image; and
  - one or more weighted connecting segments, wherein each weighted connecting segment is weighted according to a strength of mutual dependencies between the features of those nodes that are connected by the connecting segment;
- perform a graph convolution on the region composition graph to determine a feature aesthetic value for each node according to the weightings in the node's weighted connecting segments; and
- calculate a weighted average for each node's feature aesthetic value, such that a combined weighted average over the nodes of the digital image represents a combined level of aesthetic appeal for the digital image.

* * * * *